(12) United States Patent
Shigemi et al.

(10) Patent No.: US 7,480,548 B2
(45) Date of Patent: Jan. 20, 2009

(54) HIGH-ALTITUDE CAPABLE WIDE VELOCITY RANGE FLIGHT VELOCITY VECTOR MEASUREMENT PROBE AND MEASUREMENT SYSTEM

(75) Inventors: Masashi Shigemi, Tokyo (JP); Akira Koike, Tokyo (JP); Makoto Ueno, Tokyo (JP); Tomonari Hirotani, Tokyo (JP); Teruomi Nakaya, Tokyo (JP); Hiroshi Wakai, Tokyo (JP); Toru Iwata, Tokyo (JP)

(73) Assignees: Japan Aerospace Exploration Agency, Tokyo (JP); Fuji Heavy Industries Ltd., Tokyo (JP); Tokyo Aircraft Instrument Co., Ltd., Tokyo (JP)

( * ) Notice: Subject to any disclaimer, the term of this patent is extended or adjusted under 35 U.S.C. 154(b) by 478 days.

(21) Appl. No.: 11/224,030

(22) Filed: Sep. 13, 2005

(65) Prior Publication Data

US 2006/0178790 A1      Aug. 10, 2006

(30) Foreign Application Priority Data

Sep. 17, 2004      (JP) ............................ 2004-271301

(51) Int. Cl.
  G01P 5/165     (2006.01)
  G01P 5/175     (2006.01)
(52) U.S. Cl. ...................... 701/7; 73/861.65
(58) Field of Classification Search ....... None
  See application file for complete search history.

(56) References Cited

U.S. PATENT DOCUMENTS

| | | | | |
|---|---|---|---|---|
| 4,718,273 A | * | 1/1988 | McCormack | 73/180 |
| 5,099,686 A | * | 3/1992 | Kohler | 73/182 |
| 5,423,209 A | | 6/1995 | Nakaya et al. | |
| 5,797,105 A | * | 8/1998 | Nakaya et al. | 701/7 |
| 6,176,130 B1 | * | 1/2001 | Nakaya et al. | 73/182 |
| 6,336,060 B1 | | 1/2002 | Shigemi et al. | |

* cited by examiner

*Primary Examiner*—Michael J. Zanelli
(74) *Attorney, Agent, or Firm*—Westerman, Hattori, Daniels & Adrian, LLP.

(57) ABSTRACT

It is an object of the present invention to solve the problem of a drop in precision in conventional systems using a square pyramid type five-hole probe due to the drop in atmospheric pressure in high altitude ranges, and to provide a wide velocity range flight velocity vector measurement system that can prevent a drop in measurement precision. Furthermore, it is also an object of the present invention to provide a method for eliminating the effects of detection fluctuations caused by adhering water droplets, ice particles or dust in a wide velocity range flight velocity vector measurement system. The flight velocity vector measurement probe of the present invention comprises means in which a static pressure hole is formed in the tube wall surface of the probe, so that a static pressure value is obtained from the pressure detected by this static pressure hole, the Mach number M is calculated on the basis of an equation approximated by a fourth-order polynomial of the static pressure/total pressure signal and the angle of attack, and in cases where an abnormal detection value is detected, this is replaced by the preceding detection value.

16 Claims, 5 Drawing Sheets

(a) (b)

1 PITOT TUBE PROBE (a)

(b) SECTIONAL VIEW ALONG LINE A-A (a) STATIC PRESSURE HOLE POSITIONS
(SECTIONAL VIEW ALONG LINE B-B)

(b) TOTAL PRESSURE BALANCE HOLE POSITIONS
(SECTIONAL VIEW ALONG LINE C-C)

(c) STATIC PRESSURE INTRODUCT HOLE POSITIONS
(SECTIONAL VIEW ALONG LINE D-D)

POLYGONAL PYRAMID TYPE PITOT TUBE

HIGH-ALTITUDE CAPABLE WIDE VELOCITY RANGE FLIGHT VELOCITY VECTOR MEASUREMENT PROBE AND MEASUREMENT SYSTEM

BACKGROUND OF THE INVENTION

1. Field of the Invention

The present invention relates to a square pyramid type multi-hole pitot tube probe equipped with a total pressure hole located in the tip end part and four pressure holes located in the square pyramid surfaces of the base part, and a calculation system that can calculate flight velocity vectors such as the flight Mach number and the like, and the flight altitude, with high precision in a wide velocity range from low velocity to supersonic velocity at a high altitude.

2. Description of the Related Art

The present inventors previously developed a flight velocity vector measurement system using a pitot tube with a square pyramid type five-hole probe such as that shown in FIG. 7 (Japanese Patent Application Laid-Open No. 5-288761 "Flight Velocity Vector Detection System Using Polygonal Pyramid Type Pitot Tube Probe, and Polygonal Pyramid Type Pitot Tube Probe", laid open on Nov. 2, 1993), and obtained patent rights for this invention as U.S. Pat. No. 5,423,209 (Japanese Patent No. 2913005). In FIG. 7, A is a front view, and B is partially sectional side view. As is shown in the front view A, a total pressure hole is located in the central part, and respective pressure holes are formed in the four inclined surfaces of the pyramid shape. The invention of this patent is "a flight velocity vector detection system using a polygonal pyramid type pitot tube probe which is characterized in that respective sets of pressure information detected by a polygonal pyramid type pitot tube probe in which the tip end part forms a polygonal pyramid shape, a covered hole is formed in the apex of this pyramid shape, a total pressure tube which has a smaller diameter than the hole diameter is disposed and fastened in a position that is inset from the tip end of the abovementioned covered hole by a fixed length that is determined by the relationship with the diameter of the covered hole, and pressure holes are respectively formed in the respective square pyramid surfaces of the abovementioned polygonal pyramid shape, are input into velocity vector calculation processing device and converted into electrical signals, signal processing is performed using pressure coefficients of the respective holes of the abovementioned probe for velocity vectors stored beforehand in the abovementioned velocity vector calculation processing device, so that flight velocity vectors (V, α,β) for the probe axes are calculated from the abovementioned pressure information and the air density, the output of an attitude and bearing reference device is input into the abovementioned velocity vector calculation processing device, and flight velocity vectors relative to the air are calculated by combining the information from the attitude and bearing reference device with flight velocity vector information for the abovementioned aircraft axes." By using such a construction, it is possible to perform the functions of a conventional air velocity indicator, altimeter, climb indicator, Mach gauge and yaw meter using a single polygonal pyramid type pitot tube probe, so that the number of detection devices can be reduced; furthermore, these sets of information can be combined, output and displayed, so that highly reliable information relative to the air can be provided to the pilot. Moreover, the effect of the pressure coefficients in velocity variations is small, so that there is no need to perform complicated corrections, and velocity vector information can be obtained with good precision over a wide angular range.

Moreover, this system can be mounted in a wide range of aircraft ranging from general aircraft including vertical take-off and landing aircraft such as helicopters and the like to extreme supersonic aircraft including spacecraft capable of round trips into space. In addition, the effect of the pressure coefficients (in velocity variations) of the pressure holes that detect the wind direction is small, so that there is no need for complicated corrections; accordingly, velocity vector information can be detected with good precision over a wide angular range, and there is no danger that defective measurements caused by clogging, vibration or the like will occur. Thus, this invention has shown various superior merits.

Furthermore, the present inventors made improvements on the same system, and proposed U.S. Pat. No. 6,336,060 "Calculation Processing Method and System in Wide Velocity Range Flight Velocity Vector Measurement System Using Square Pyramid Type Five-Hole Pitot Tube". It was an object of this invention to provide a calculation processing algorithm which was capable of calculating, at a high precision and high updating rate, flight velocity vectors indicating the magnitude of the velocity and the air flow angle, and the static pressure indicating altitude, over a wide velocity range from low velocity to supersonic velocity. In this calculation processing method, approximate equations for determining the angle of attack α and the sideslip angle β have the form of third-order equations for the known quantities of the attack angle pressure coefficient Cα and sideslip angle pressure coefficient Cβ, and are expressed as polynomial equations up to the fifth order for Mach numbers M (for which the respective coefficients can be assigned instantaneously from a lookup table). This method is devised so the calculation of the coefficients of the polynomial equations and the calculation of the angle of attack α and sideslip angle β can be accomplished by performing simple calculations in which known quantities are inserted and specified in approximate equations; in this method, since Mach numbers can be instantaneously obtained from a lookup table by specifying the Mach pressure coefficient CM and flow angle pressure coefficient (relative to air) Cγ, flight velocity vector measurements over a wide velocity range can be performed with a high updating rate.

However, in cases where these existing wide velocity range flight velocity vector measurement systems equipped with a square pyramid type five-hole probe are used, the following problem has been encountered: namely, although the velocity and attitude angle of aircraft flying at various attitude angles and velocities ranging from low velocity to high velocity at ordinary altitudes (12 km or lower) can be determined with a high degree of precision, the precision of the same system, in which the static pressure is determined by calculation from the pressure signals of the five holes, drops in the case of aircraft flying at high altitudes that may reach a distance of as much as 30 km from the surface of the earth, due to the fact that the atmospheric pressure is lower at such high altitudes.

Furthermore, in the case of pitot tube probes mounted on aircraft, the following problem has also been encountered: namely, instantaneous blockage of the detection holes during flight may be caused by water droplets or ice particles (under meteorological conditions such as rain and snow), or as a result of dust contained in the atmosphere contacting the probe, so that the detection system malfunctions.

SUMMARY OF THE INVENTION

It is an object of the present invention to provide a wide velocity range flight velocity vector measurement system which can solve the problem of the drop in precision seen in conventional systems using a square-pyramid type five-hole probe that is caused by the drop in atmospheric pressure that occurs in the case of aircraft flying at high altitudes that reach distances of up to 30 km from the surface of the earth, and which can thus prevent a drop in the measurement precision.

Furthermore, it is an object of the present invention to provide a method for eliminating the effects of detection fluctuations caused by the adhesion of water droplets, ice particles or dust in a wide velocity range flight velocity vector measurement system.

In conventional wide velocity range flight velocity vector measurement systems using a square pyramid type five-hole probe, the static pressure is obtained by calculation on the basis of pressure information detected during flight by a total pressure hole located in the tip end part and four pressure holes located in the square pyramid surfaces. In the flight velocity vector measurement probe of the present invention, however, in order to prevent a drop in the precision of the flight Mach number calculated during flight at high altitudes, a static pressure hole is formed in the tube wall surface of the probe, and the system is devised so that a high-precision Mach number and altitude can be determined by using the pressure detected by this static pressure hole as new pressure information. The pressure detected by this static pressure hole shows a value that fluctuates according to the abovementioned total pressure balance hole position and the attitude angle of the probe, and also includes effects of the aircraft located behind the probe (e.g., positional error), so that this pressure differs from the atmospheric pressure (true static pressure) at this position. However, this pressure reflects the magnitude of the true atmospheric pressure, and is a value which has a magnitude that is substantially equal to that of the true static pressure.

The static pressure hole of the wide velocity range flight velocity vector measurement probe of the present invention actually comprises a plurality of holes each disposed the tube wall in positions located in front of the total pressure balance hole, with these holes being disposed at equal intervals centering on the three o'clock and nine o'clock positions as indicated in a clock face display of the cross section of the tube.

The wide velocity range flight velocity vector measurement system of the present invention is equipped with the abovementioned measurement probe, and is devised so that the reference Mach number Ms is calculated from the total pressure signal Ph, the static pressure signal Ps and the value of attack angle α on the basis of an equation which is approximated by a fourth-order polynomial of Ps/Ph and α. Furthermore, this system is devised so that wide velocity range from low velocity to supersonic velocity is divided into several velocity ranges, and a reference Mach number Ms with good precision is obtained by determining respective coefficients of the abovementioned approximation.

Furthermore, the system of the present invention is devised so that coefficients are determined for a plurality of sideslip angles β using the abovementioned approximation, and the Mach number M for an arbitrary sideslip angle β is calculated by interpolation from the output of two reference Mach numbers Ms calculated using two calibrated β coefficients having this angle therebetween.

Furthermore, the wide velocity range flight velocity vector measurement system of the present invention is devised so that this system comprises means whereby signals based on pressure information from the total pressure hole, the four pressure holes in the square pyramid surfaces of the base part and the static pressure hole, which is taken in at the sampling interval, are compared with the values for the preceding frame, the data for the current frame is taken as the data for that point in time if the difference data does not exceed a threshold value, and the data for the preceding frame is read out and substituted for the data of the current frame in cases where it is judged that the difference data is an abnormal value that exceeds the threshold value.

Since the present invention is devised so that Mach number calculations are performed by adding static pressure information obtained from static pressure holes that are newly added to the side surface parts of the pitot tube to the five sets of pressure information obtained by means of a conventional square pyramid type five-hole probe, a static pressure value that is substantially equal to the true static pressure surrounding the aircraft can be directly determined. Furthermore, since the difference between this pressure and the total pressure is a value that is larger than the difference from the pressure on the inclined surfaces of the square pyramid, the error in the Mach number that is calculated by means of the Mach table is reduced. Accordingly, highly precise flight Mach numbers that could not be obtained using conventional square pyramid type five-hole probes in high altitude ranges such as altitudes of 30 km can be obtained with good precision.

Furthermore, since the static pressure holes formed in the probe tube wall in the system of the present invention comprise a plurality of holes each respectively disposed at equal intervals centering on the three o'clock and nine o'clock position on a clock face display in the cross section of the tube, static pressure values that show no great variation in characteristics due to variations in the magnitude of the angle of attack or sideslip angle can be detected; this makes it possible to calculate Mach number values that show good precision. Furthermore, since the static pressure holes are disposed in positions located in front of the total pressure balance hole that do not overlap with the total pressure balance hole, static pressure values showing good precision that are not affected by the air flow that is discharged from the total pressure balance hole can be detected.

In the wide velocity range flight velocity vector measurement system of the present invention, reference Mach numbers Ms are calculated from the values of the total pressure signal Ph, static pressure signal Ps and angle of attack α on the basis of an equation approximated by a fourth-order polynomial equation of α and Ps/Ph; furthermore, this system is devised so that coefficients for a plurality of sideslip angles β are determined using the abovementioned approximation, and so that the Mach number M for an arbitrary sideslip angle β is calculated by interpolation from the output of two reference Mach numbers Ms calculated using two calibrated β coefficients having this angle therebetween. Accordingly, it is possible to obtain Mach numbers that show a higher precision than those obtained by a conventional method in which Mach numbers are read directly from the air flow angle pressure coefficient Cγ and Mach pressure coefficient CM using a lookup table system. Furthermore, when the precision of the Mach number deteriorates, the precision of the altitude calculated using this Mach number also deteriorates; however, since a drop in the precision of the Mach number can be prevented in the present method, a drop in the precision of the altitude determined using the same calculation system can be prevented.

Moreover, by dividing a wide velocity range from low velocity to supersonic velocity into several velocity ranges, and determining the respective coefficients of the abovementioned approximation, it is possible to obtain Mach number showing good precision for a wide velocity range.

Furthermore, the wide velocity range flight velocity vector measurement system of the present invention is devised so that this system comprises means whereby signals based on pressure information from the total pressure hole, the four pressure holes in the square pyramid surfaces of the base part and the static pressure hole, which is taken in at the sampling interval, are compared with the values for the preceding frame, the data for the current frame is taken as the data for that point in time if the difference data does not exceed a threshold value, and the data for the preceding frame is read out and substituted for the data of the current frame in cases where it is judged that the difference data is an abnormal value that exceeds the threshold value. Accordingly, even if the detection holes are blocked by rain, snow, dust or the like, erroneous detection caused by such blockage can be effectively eliminated.

DESCRIPTION OF THE PREFERRED EMBODIMENTS

Figure 1:
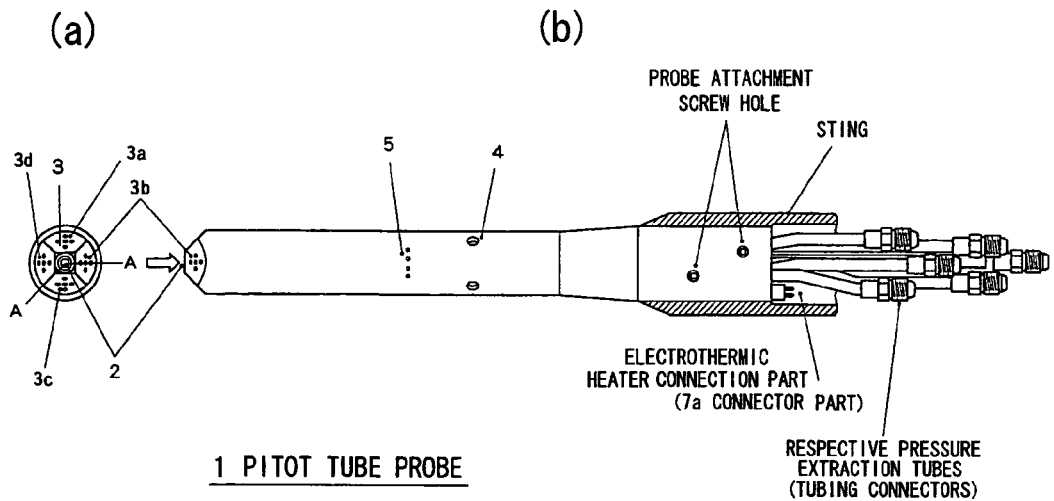
FIG. 1A shows a front view and FIG. 1B a side view of the polygonal pyramid type six-hole pitot tube probe of the present invention.
Figure 2:
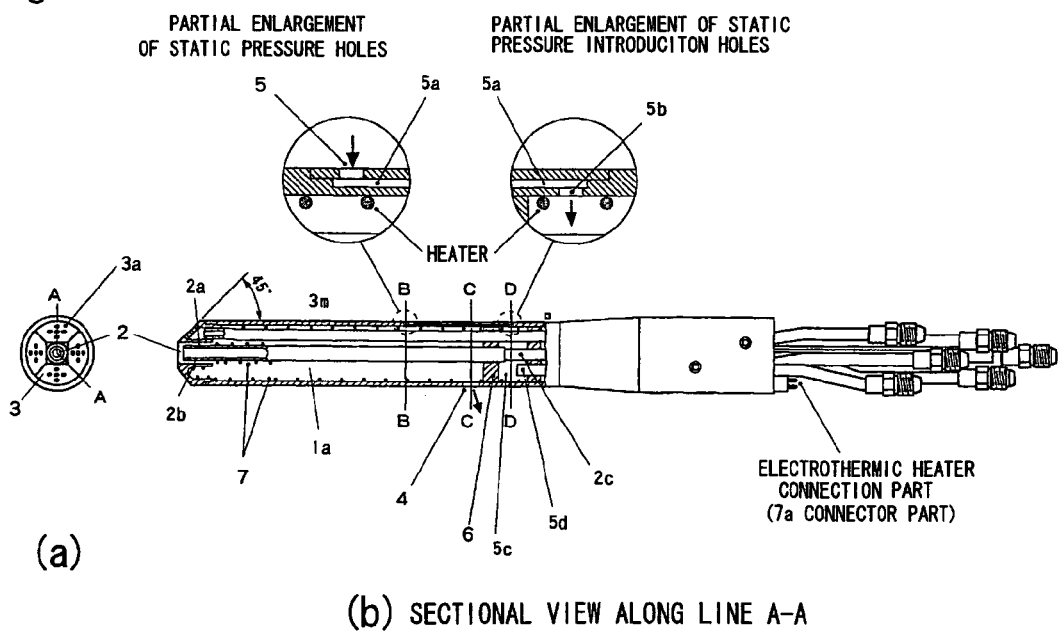
FIG. 2A shows a front view and FIG. 2B a partially sectional side view and partial enlargement of the six-hole pitot tube probe of the present invention.
Figure 3:
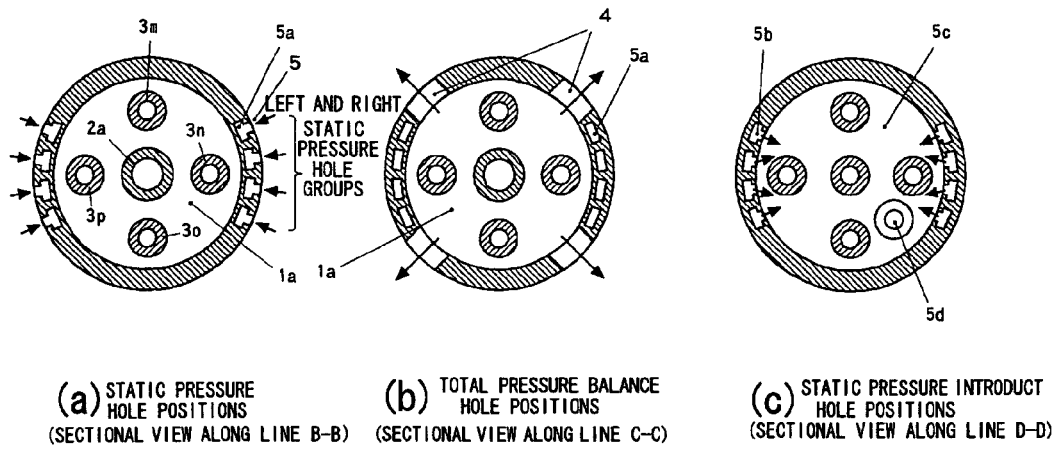
FIG. 3A shows a sectional view along line B-B in FIG. 2B, FIG. 3B a sectional view along line C-C in FIG. 2B, and FIG. 3C a sectional view along line D-D in FIG. 2B, of the six-hole pitot tube probe of the present invention.
Figure 7:
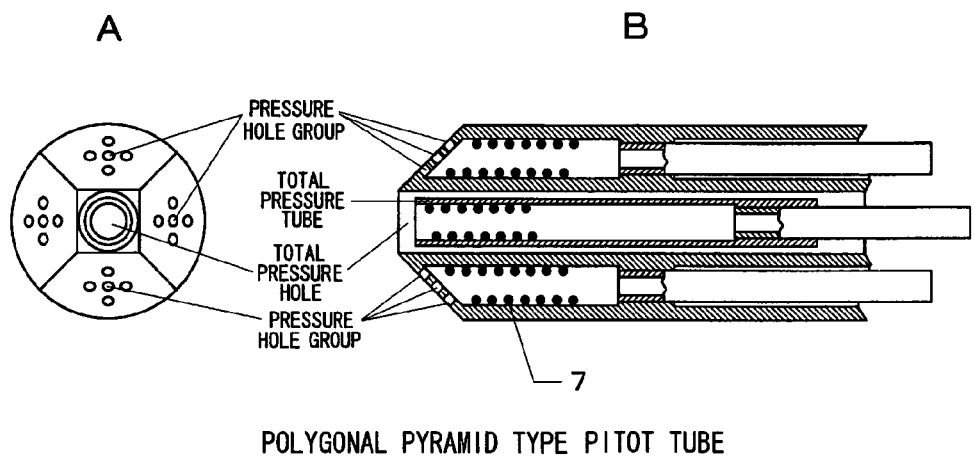
FIG. 7 is a diagram showing the basic construction of a conventional polygonal pyramid type five-hole pitot tube probe.

The present invention is characterized in that static pressure holes are formed in the tube wall surface of the probe, and the pressure values detected by these static pressure holes are added to the basic data that is used for Mach number calculation in order to prevent a drop in the precision of the flight Mach number calculated in the case of flight at high altitudes. The concrete structure of the present invention will be described with reference to FIGS. 1 through 3. FIG. 1 shows a front view and a side view of the six-hole probe of the present invention. FIG. 2 shows a front view of the same and a sectional side view of the tube part along line A-A, and also shows partial enlargements of the same. FIG. 3 shows sectional views along lines B-B, C-C and D-D. As is shown in these figures, a total pressure hole 2 is located in the central portion of the tip end of the pitot tube 1 and respective pressure holes 3a, 3b, 3c and 3d are formed in the square pyramid inclined surfaces 3 of the pyramid shape. As is seen from the sectional view along line A-A shown in FIG. 2, the total pressure tube 2a comprises a slender tube structure whose end part is located in position that is slightly recessed from the opening part of the total pressure hole 2 in the tip end of the pitot tube, and an annular gap 2b is formed between the total pressure hole 2 and the total pressure tube 2a, so that the total pressure ph that is received during flight acts on the tip end part of the total pressure tube 2a and the annular gap 2b. The total pressure that acts on the tip end part of the total pressure tube 2a is transmitted to the detection part by a total pressure extraction guide tube 2c which is connected to the rear of the total pressure tube 2a, and which acts as a guide tube. The annular gap 2b communicates with an intra-tube cavity part 1a, and total pressure balance holes 4 are caused to open into this intra-tube cavity part 1a in the side surface of the tube. Accordingly, since the total pressure that is applied to the annular groove 2b escapes into the total pressure balance holes 4 via the abovementioned intra-tube cavity part 1a , an air current is purged from the total pressure balance holes 4 in the manner of a jet current. Such a construction is used to detect the total pressure with good precision even in an attitude in which the aircraft axis has an angular difference from the direction of travel. In the pressure holes 3a, 3b, 3c and 3d formed in the inclined surfaces 3 of the square pyramid, four surface pressures pa, pb, pc and pd are received as basic data for the calculations described later. As is seen from FIG. 3, this constitutes a structure which conducts the respective pressures to the detection part via respective pressure guide tubes 3m, 3n, 3o and 3p disposed in the intra-tube cavity part 1a, and pressure extraction tubes.

The characterizing structure of the six-hole of the present invention lies in the fact that static pressure holes 5 are formed in the side walls of the pitot tube 1 in addition to the abovementioned single total pressure tube 2 and four pressure receiving holes 3a, 3b, 3c and 3d. In order to avoid the effects of the air current that is purged from the total pressure balance holes 4, these static pressure holes 5 are formed in positions in the side wall B-B of the pitot tube that are located further forward than the total pressure balance holes 4 (as is shown in FIG. 1), so that these holes do not overlap with the total pressure balance holes (the static pressure holes are located in positions centering on three o'clock and nine o'clock, while the total pressure balance holes are located in positions centering on one-thirty, four-thirty, seven-thirty and ten-thirty). Preferably, these holes are formed by groups of small holes each comprising a plurality of holes (four holes each in the example shown in the figures) disposed in the circumferential direction so that these holes are centered on opposite positions corresponding to three o'clock and nine o'clock on a clock face in the cross section of the pitot tube 1. The static pressure Ps received by the abovementioned static pressure holes 5 located in the B-B positions is conduced to a static pressure chamber 5a constituting a cavity part inside the pitot tube via static pressure guide holes 5a that are formed inside the tube walls and extended to the D-D positions in the rear, and static pressure introduction holes 5b that are formed in the D-D positions. Furthermore, this static pressure Ps is conducted to the detection part via a static pressure extraction guide tube 5d that connects this static pressure chamber 5c and the detection part. As is seen from FIG. 2, this static pressure chamber is partitioned by a pressure blocking wall 6 in a position located to the rear of the abovementioned intra-tube cavity part 1a.

An electrothermic heater coil 7 is installed inside this pitot tube 1 in order to prevent icing; 7a in the figures indicates a connector part that supplies an electric current to this electrothermic heater coil 7.

Next, a method and system for calculating flight vectors (Mach number M, angle of attack α, sideslip angle β) and information on static pressure p and dynamic pressure q with high precision and in real time, and transmitting these flight vectors and information to a display device, flight control device or the like using this new six-hole probe will be described. The six sets of pressure information that are detected (total pressure: ph, pressure group 1: pa, physical address, pressure group 2: pb, pressure group 3: pc, pressure group 4: pd) are received from the six-hole pitot tube probe shown in FIGS. 1 through 3, and are calculated and transmitted by the calculation processing device 10 of the flight velocity vector measurement system shown in FIG. 4. As is shown in the left part of this figure, six sets of pressure information from the square pyramid type six-hole probe 1 of the present invention and a temperature signal from the atmospheric temperature instrument 20 are received, and the calculation results are transmitted to the display device/flight control device or the like shown in the right part of the figure. The calculation processing device 10 contains a primary calculation processing part 10a which receives the six sets of pressure information from the six-hole probe 1, and converts these sets of information into electrical signals corresponding to voltage values via a converter, and which calculates the angle of attack pressure coefficient $C\alpha$, sideslip angle pressure coefficient $C\beta$, pressure coefficient $C\gamma$ of the flow angle relative to the air, and the Mach pressure coefficient CM, a secondary calculation processing part 10b comprising a lookup table, which calculates the Mach number from the pressure coefficient $C\gamma$ of the flow angle relative to the air and the Mach pressure coefficient CM, and which calculates the angle of attack $\alpha$ and the sideslip angle $\beta$, a tertiary calculation processing part 10c which calculates the temperature, altitude and rate of climb or descent from the temperature signal, total pressure signal and static pressure signals, and a quaternary calculation processing part 10d which calculates flight vectors such as the Mach number M and the like with a high degree of precision from the dynamic pressure value Ph and static pressure value Ps calculated by the primary calculation processing part 10a and the angle of attack $\alpha$ and sideslip angle $\beta$ calculated by the secondary calculation processing part 10b. This calculation processing part 10 transmits the dynamic pressure value Ph and static pressure value Ps from the primary calculation processing part 10a, the pressure signals Pa, Pb, Pc and Pd for the four surfaces, the temperature, altitude, rate of climb or descent, dynamic pressure q and static pressure p calculated by the third calculation processing part 10c, and the flight velocity vectors calculated by the quaternary calculation processing part 10d, to the display device/flight control device or the like.

Figure 5:
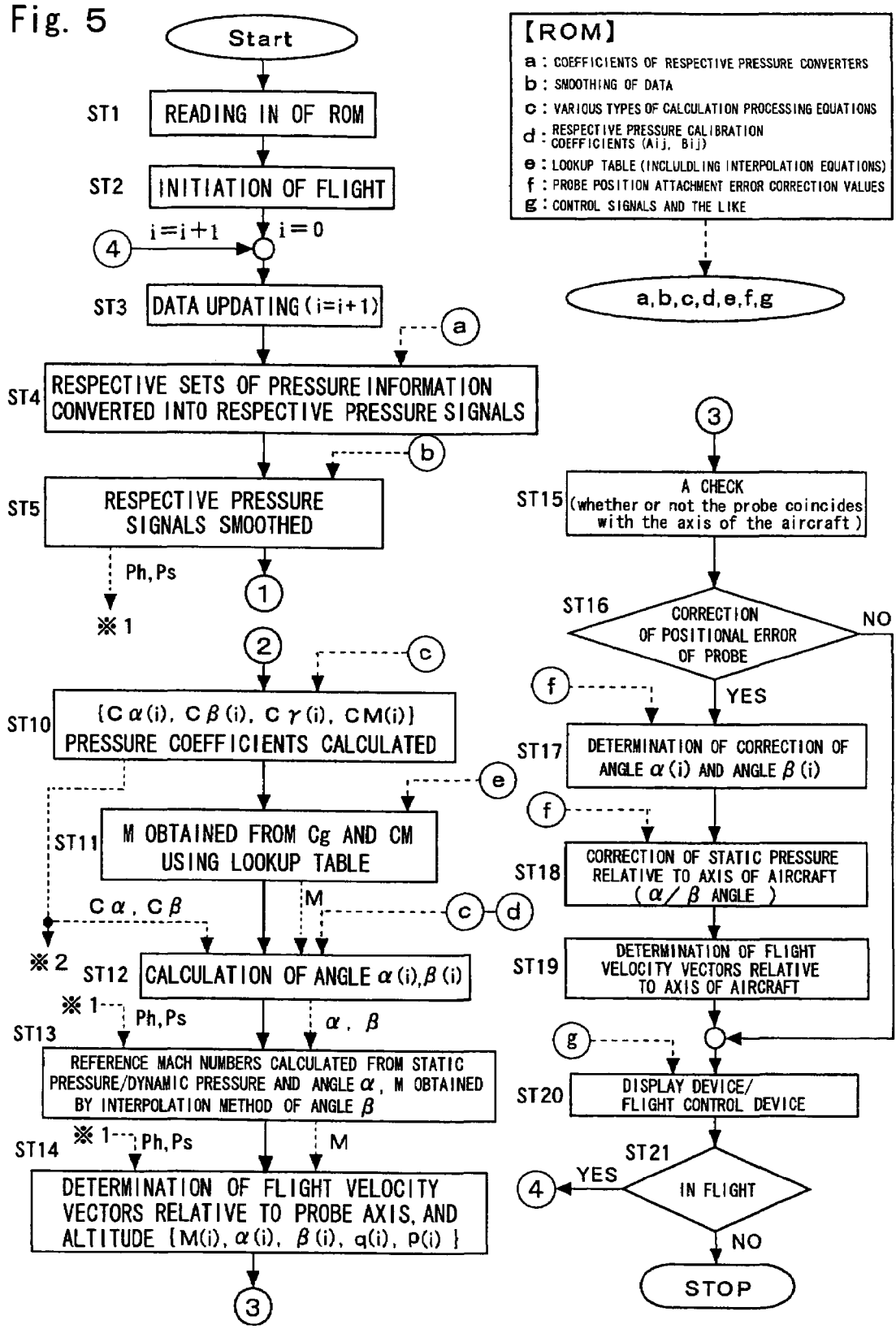
FIG. 5 is a flow chart which illustrates the operation of the system of the present invention.

The operation of the system of the present invention during flight will be described with reference to the flow chart shown in FIG. 5. In the flight preparation stage of step 1, data accumulated in the ROM is read out into the work area. As is indicated in the upper right frame in the figure, this data comprises a: coefficients for the respective pressure converters, b: data smoothing equations, c: various types of calculation processing equations, d: respective pressure calibration coefficients (Aij, Bij), e: lookup table (including interpolation equations), f: probe position attachment error correction values, g: control signals, and the like. When the flight is initiated in step 2, the input of data from the probe is initiated, and the input data is successively updated in a time series in step 3. In step 4, "a: coefficients of the respective pressure converters" are applied to the total pressure: ph, static pressure: ps, and pressures on the four surfaces: pa, pb, pc and pd, which constitute updated detection information from the six holes, so that these items of information are converted into a total pressure signal Ph, a static pressure signal Ps, and pressure signals Pa, Pb, Pc and Pd for the four surfaces (electrical signals). In step 5, smoothing processing is performed for these pressure signals using "b: the data smoothing equation". Specifically, in the present invention, signals for each sampling time (e.g., each 1/32 of a second) are used; however, sample values are obtained by smoothing the variation within this sampling time.

In cases where an erroneous signal eliminating means (described later) is not interposed, the respective pressure signals obtained here proceed "as is" to step 10, and the attack angle pressure coefficient $C\alpha$ of the air stream, the sideslip angle pressure coefficient $C\beta$ of the air stream, the pressure coefficient $C\gamma$ of the angle relative to the air stream (which is the angle of the air stream with respect to the probe axis), and the Mach pressure coefficient CM, are calculated using "c: various calculation processing equations".

Here, the calculation equations are as follows:

$$C\alpha=(Pa-Pc)/Ph \quad (1)$$

$$C\beta=(Pb-Pd)/Ph \quad (2)$$

$$C\gamma=(C\alpha 2+C\beta 2)^{1/2} \quad (3)$$

$$CM=[Ph-(Pa+Pb+Pc+Pd)/4]/Ph \quad (4)$$

Primary calculation processing is performed in which the pressure coefficient $C\gamma$ for the angle relative to the air stream (which is the angle of the air stream with respect to the axis of the abovementioned six-hole probe) is obtained by substituting the attack angle pressure coefficient $C\alpha$ of the air stream calculated by substitution into Equation (1) (which is made dimensionless by dividing the differential pressure signal of the upper and lower pressure holes of the six-hole probe (Pa–Pc) by the central total pressure signal Ph), and the sideslip angle coefficient $C\beta$ of the air stream calculated by substitution into Equation (2) (which is made dimensionless by similarly dividing the differential pressure signal of the left and right pressure holes (Pb–Pd) by the central total pressure signal Ph), into Equation (3), and the Mach pressure coefficient CM is further obtained by substituting the differential pressure signal of the total pressure signal Ph and the four mean pressures on the square pyramid surfaces {Ph–(Pa+Pb+Pc+Pd)/4} into Equation (4), which is similarly made dimensionless by the central total pressure signal Ph. The processing from the abovementioned step 4 to this step 10 is performed by the primary calculation processing part 10a surrounded by a broken line in FIG. 4.

In the present invention, the Mach number M is calculated from the air stream angle pressure coefficient $C\gamma$ and Mach pressure coefficient CM determined beforehand, and a Mach number table is prepared; then, in step 11, the Mach number is read directly (using the lookup table system) from the air stream angle pressure coefficient $C\gamma$ and Mach pressure coefficient CM determined in step 10. Specifically, the Mach pressure coefficient CM and pressure coefficient $C\gamma$ of the angle relative to the air stream are determined beforehand from the set Mach number M obtained during calibration wind testing with the abovementioned six-hole probe applied to a wind tunnel, and the five sets of pressure information (other than the static pressure) obtained in each setting of the angles $\alpha$ and $\beta$ of the six-hole probe (set angular values of the probe relative to the axis of the air stream), and a lookup table (e: lookup table (including interpolation equations) accumulated in the ROM) which graphs the Mach numbers M on an orthogonal plane consisting of the pressure coefficient $C\gamma$ of the angle relative to the air stream on the horizontal axis, and the Mach pressure coefficient CM on the vertical axis, is constructed on the basis of the three parameters of the abovementioned Mach number M, pressure coefficient $C\gamma$ of the angle relative to the air stream, and Mach pressure coefficient CM. Then, the Mach number M can be directly determined by applying the pressure coefficient Cγ of the angle relative to the air stream and Mach pressure coefficient CM obtained in step 10. The calculation of the angle of attack α and sideslip angle β (which are air stream angles) performed in step 12 is accomplished as follows: namely, a third-order polynomial (5) relating to the angle of attack α is set up using the Mach number obtained from this lookup table, "d: the attack angle pressure calibration coefficient Aij" determined beforehand, and the abovementioned Mach pressure coefficient Cα. Similarly, a third-order polynomial "c: calculation processing equation" relating to the sideslip angle β is set up for the abovementioned Mach number M, "d: the sideslip angle β pressure calibration coefficient Bij" determined beforehand, and the abovementioned Mach pressure coefficient Cβ. Then, the angle of attack a and sideslip angle β are determined directly from the abovementioned third-order polynomials (5) and (6).

$$\alpha = A0 + A1C\alpha + A2C\alpha^2 + A3C\alpha^3 \quad (5)$$

$$A0 = A00 + A01M + A02M^2 + A03M^3 + A04M^4 + A05M^5$$

$$A1 = A10 + A11M + A12M^2 + A13M^3 + A14M^4 + A15M^5$$

$$A2 = A20 + A21M + A22M^2 + A23M^3 + A24M^4 + A25M^5$$

$$A3 = A30 + A31M + A32M^2 + A33M^3 + A34M^4 + A35M^5$$

$$\beta = B0 + B1C\alpha + B2C\alpha^2 + B3C\alpha^3 \quad (6)$$

$$B0 = B00 + B01M + B02M^2 + B03M^3 + B04M^4 + B05M^5$$

$$B1 = B10 + B11M + B12M^2 + B13M^3 + B14M^4 + B15M^5$$

$$B2 = B20 + B21M + B22M^2 + B23M^3 + B24M^4 + B25M^5$$

$$B3 = B30 + B31M + B32M^2 + B33M^3 + B34M^4 + B35M^5$$

Furthermore, the abovementioned third-order polynomials (5) and (6) and coefficients are accumulated in the ROM as "c: various calculation processing equations" and "d: respective pressure calibration coefficients (Aij, Bij)".

Figure 4:
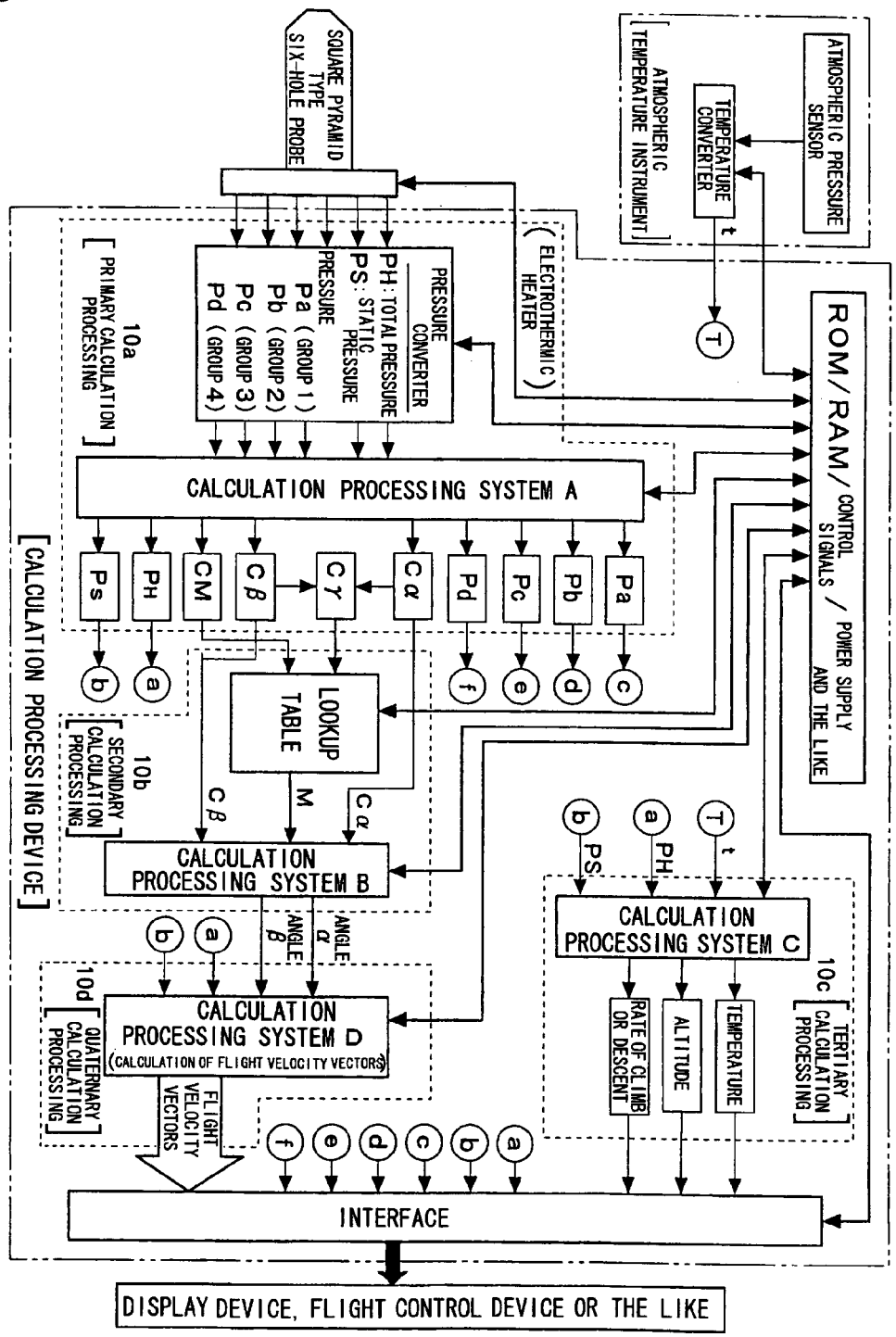
FIG. 4 is a block diagram which illustrates the function of the calculation processor in the system of the present invention.

The operations of the above steps 11 and 12 are performed by the secondary calculation processing part 10b surrounded by a broken line in the calculator 10 shown in FIG. 4.

The present invention comprises means that obtains accurate Mach numbers M from the Mach numerical values obtained in step 11, as a result of this means being able to detect static pressure information ps directly. Specifically, in step 13, reference Mach numbers Ms are first calculated on the basis of the following equation approximated by a fourth-order polynomial equation of Ps/Ph and α, from the previous total pressure signal Ph and static pressure signal Ps, and the value of attack angle α determined in step 12.

$$Ms(\alpha, Ps/Ph) = C40\alpha^4 + C31\alpha^3(Ps/Ph) + C22\alpha^2(Ps/Ph)^2 + \quad (7)$$
$$C13\alpha(Ps/Ph)^3 + C04(Ps/Ph)^4 +$$
$$C30\alpha^3 + C21\alpha^2(Ps/Ph) + C12\alpha(Ps/Ph)^2 +$$
$$C03(Ps/Ph)^3 + C20\alpha^2 + C11\alpha(Ps/Ph) +$$
$$C02(Ps/Ph)^2 + C10\alpha + C01(Ps/Ph) + C00$$

Furthermore, Cij in the equation is a matrix coefficient determined by a wind tunnel test in which a plurality of values for the sideslip angle β (in concrete terms, β=0°, 2.5°, 5°, 7.50°). For an arbitrary β, the value of the reference Mach number Ms is calculated by the above equation using two calibrated β coefficients having this angle therebetween, and the Mach number M corresponding to the value of β is calculated by interpolation from both of these output values. Furthermore, a high-precision approximation cannot be obtained over a wide range from low velocity to supersonic velocity using a single set of Cij; accordingly, highly precise reference Mach numbers Ms can be obtained by dividing this velocity range into several velocity ranges, and determining coefficients Cij for the respective regions, so that the Mach number M that is ultimately obtained is a high-precision value.

Temperature information is detected by a separately installed atmospheric temperature instrument; this instrument receives a signal that is converted into a temperature signal, and outputs temperature information. These operations are performed by the tertiary calculation processing part 10c that is surrounded by a broken line in the calculator 10 shown in FIG. 4.

The dynamic pressure q and static pressure p are calculated in step 14 using the total pressure signal Ph and the accurate Mach number M determined in step 3, in an operation that is parallel to the operations described above. In this calculation, a different calculation formula is applied in accordance with the band region of the Mach number; the equations used are shown below.

1) M<0.2: in the case of the low-velocity range:

$$q = Ph[1-(1+0.2M^2)]^{-7/2} \quad (8\text{-}1)$$

$$p = Ph(1+0.2\,M^2)^{-7/2} \quad (9\text{-}1)$$

2) 0.2<M<1: in the case of the transonic velocity range:

$$q = Ph[0.7M^2(1+0.2M^2)]^{-7/2} \quad (8\text{-}2)$$

$$p = Ph(1+0.2M^2)^{-7/2} \quad (9\text{-}2)$$

3) M>1: in the case of the supersonic velocity range:

$$q = Ph \times 0.7M^2(1.2M^2)^{-7/2}[6/(7M^2-1)]^{-5/2} \quad (8\text{-}3)$$

$$p = Ph(1.2M^2)^{-7/2}[6/(7M^2-1))]^{-5/2} \quad (9\text{-}3)$$

Flight velocity vectors relative to the probe axis, and the dynamic pressure and static pressure, are obtained by the above calculations. Thus, in the present invention, in regard to the static pressure corresponding to altitude information, static pressure information ps is directly detected by the static pressure holes; accordingly, a static pressure signal Ps is already obtained in the stage of step 5. Accordingly, altitude information is obtained on the basis of this; furthermore, differentiation calculations are performed so that the rate of climb or descent (which is the amount of variation in this information) is also obtained. The present invention differs greatly from conventional devices in that this static pressure information is not obtained by calculation using pressure signals Pa, Pb, Pc and Pd for the four surfaces and the total pressure signal Ph, but can rather be directly detected. As a result, static pressure information at high altitudes, and altitude information based on this static pressure information, can be obtained with good precision. Incidentally, since the precision of the altitude value in conventional systems is a precision of approximately 1%, the error at high altitudes may be as much as 100 meters; in the present invention, however, a precision of a few tens of meters (0.3%) or better has been confirmed.

Furthermore, these calculations of step 13 and step 14 are performed by the quaternary calculation processing part 10d surrounded by a broken line in the calculator 10 shown in FIG. 4.

In step 15, a check is made in order to ascertain whether or not the probe coincides with the axis of the aircraft. If there is any skewing in the attachment of the probe, a correction value "f: probe position attachment error correction value" corresponding to the probe position attachment error is stored in memory beforehand in step 16; this value is read out, and the error is corrected for the angle of attack $\alpha$ and sideslip angle $\beta$. Correction of the static pressure with respect to the axis of the aircraft is performed in step 17. In step 18, the data obtained by the abovementioned correction calculations is determined as flight velocity vectors relative to the axis of the aircraft, and is stored in memory. These values are transmitted as measurement signals to the display device or flight control device in step 19. In cases where it is judged in step 15 that the probe coincides with the axis of the aircraft, no correction is necessary; accordingly, the values of the data relative to the probe axis obtained in step 14 are used "as is" as data relative to the axis of the aircraft, and the processing proceeds to step 19. After the values are transmitted in step 19, a check is made in step 20 as to whether or not the flight is continued. In cases where the flight is continued, the processing returns to step 3, calculations are performed on the basis of new detection information, and updating processing of the data is performed. In cases where the flight is ended, this constitutes a stop, and the working operations are ended.

Figure 6:
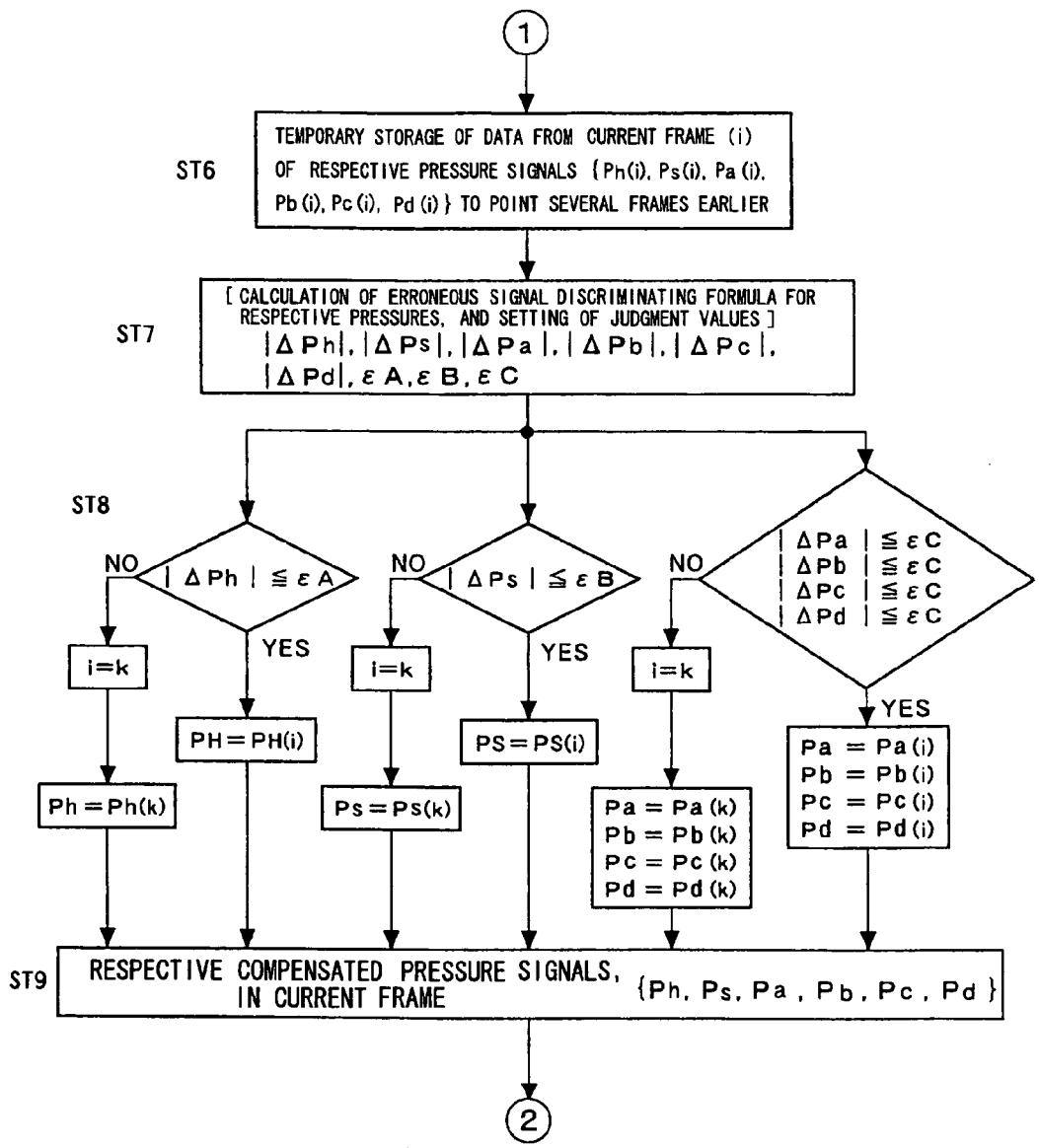
FIG. 6 is a flow chart which illustrates the erroneous signal elimination operation used in the system of the present invention.

There are instances in which foreign matter such as rain, snow, dust or the like collides with the pressure holes of the pitot tube during flight, so that there is an instantaneous violent fluctuation in the pressure. In the system of the present invention, however, means is provided which discriminates such erroneous signals, and excludes these signals from the input information. This means is disposed in the after-stage that converts pressure information from the six-hole probe into electrical pressure signals, and the flow of the operation of this means is performed between step 5 and step 10 in the flow chart shown in FIG. 5. The operation of this part is performed as shown in FIG. 6. Specifically, for the total pressure signal Ph, static pressure signal Ps, and pressure signals Pa, Pb, Pc and Pd for the four surfaces that are acquired at each sampling time (e.g., each 1/32 of a second) in step 6, the portion extending from the current frame to a point several frames earlier is temporarily accumulated in the memory. In step 7, the respective sets of data that are taken in are subject to calculations that calculate the difference from the corresponding data of the preceding frame, and the amount of variation is calculated. In step 8, a judgment is made as to whether or not this amount of variation exceeds a threshold value that may occur in the environment. A threshold value $\epsilon A$ for the total pressure signal Ph, a threshold value $\epsilon B$ for the static pressure signal Ps, and a threshold value $\epsilon C$ for the pressure signals Pa, Pb, Pc and Pd of the four surfaces, are set beforehand. In step 9, if the compared data does not exceed these threshold values, then the data of the current frame is used as the data for this point in time; on the other hand, in cases where the values are judged to be abnormal values that exceed the threshold values, the data of the preceding frame is read out and substituted for the data of the current frame. In cases where the abnormal value continues, the data of a still earlier frame is used. Accordingly, not just data of the preceding frame, but data extending to a point several frames earlier, is temporarily stored in memory.

What is claimed is:

1. A high altitude capable wide velocity range flight velocity vector measurement probe, comprising:

a square pyramid type probe disposed at a tip part of a pitot tube, a total pressure hole formed in an end part of said square pyramid type probe, four pressure holes formed in square pyramid surfaces of said square pyramid type probe, at least one total pressure balance hole formed in a tube wall surface of said pitot tube, and at least one static pressure hole formed between said square pyramid type probe and said at least one total pressure balance hole.

2. The wide velocity range flight velocity vector measurement probe according to claim 1, further comprising:

groups of static pressure holes formed at uniform intervals centering on three o'clock and nine o'clock positions in terms of a clock face display in a tube cross section of said probe, said groups of static pressure holes being disposed between said square pyramid type probe and said at least one total pressure balance hole.

3. A wide velocity range flight velocity vector measurement system, comprising:

said measurement probe according to claim 2, and a means for calculating a reference Mach number Ms from a total pressure signal Ph, a static pressure signal Ps and a value of attack angle $\alpha$ on the basis of the following equation which is approximated by a fourth-order polynomial of Ps/Ph and $\alpha$, $$Ms(\alpha, Ps/Ph) = C40\alpha^4 C31\alpha^3(Ps/Ph) + C22\alpha^2(Ps/Ph)^2 C13\alpha(Ps/Ph)^3 + C04(Ps/Ph)^4 + C30\alpha^3 C21\alpha^2(Ps/Ph) + C12\alpha(Ps/Ph)^2 + C03(Ps/Ph)^3 C20\alpha^2 + C11\alpha(Ps/Ph) + C02(Ps/Ph)^2 + C10\alpha + C01(Ps/Ph) + C00$$

where Cij is a matrix coefficient determined by wind tunnel tests in which a plurality of values of sideslip angle $\beta$ are set.

4. The wide velocity range flight velocity vector measurement system according to claim 3, further comprising a means for obtaining a highly precise reference Mach number by splitting a wide velocity range from low velocity to supersonic velocity into several velocity ranges, and determining the respective coefficients Cij.

5. The wide velocity range flight velocity vector measurement system according to claim 4, further comprising a means for calculating the Mach number M for an arbitrary sideslip angle $\beta$ by interpolation from an output of two reference Mach numbers Ms calculated using two calibrated $\beta$ coefficients having the angle $\beta$ therebetween.

6. The wide velocity range flight velocity vector measurement system according to claim 3, further comprising a means for calculating the Mach number M for an arbitrary sideslip angle $\beta$ by interpolation from an output of two reference Mach numbers Ms calculated using two calibrated $\beta$ coefficients having the angle $\beta$ therebetween.

7. The wide velocity range flight velocity vector measurement probe according to claim 1, wherein said at least one static pressure holes communicates with a static pressure chamber via a static pressure guide hole bored through a tube wall member of said probe, said static pressure chamber being disposed on an opposite side of said at least one total pressure balance hole, relative to said square pyramid type probe.

8. A wide velocity range flight velocity vector measurement system, comprising:

said measurement probe according to claim 7, and a means for calculating a reference Mach number Ms from a total pressure signal Ph, a static pressure signal Ps and a value of attack angle $\alpha$ on the basis of the following equation which is approximated by a fourth-order polynomial of Ps/Ph and $\alpha$, $$C40\alpha^4+C31\alpha^3(Ps/Ph)+C22\alpha^2(Ps/Ph)^2+C13\alpha(Ps/Ph)^3+C04(Ps/Ph)^4+C30\alpha^3+C21\alpha^2(Ps/Ph)+C12\alpha(Ps/Ph)^2+C03(Ps/Ph)^3+C20\alpha^2+C11\alpha(Ps/Ph)+C02(Ps/Ph)^2+C10\alpha+C01(Ps/Ph)+C00$$

where Cij is a matrix coefficient determined by wind tunnel tests in which a plurality of values of sideslip angle $\beta$ are set.

9. The wide velocity range flight velocity vector measurement system according to claim 8, further comprising a means for obtaining a highly precise reference Mach number by splitting a wide velocity range from low velocity to supersonic velocity into several velocity ranges, and determining the respective coefficients Cij.

10. The wide velocity range flight velocity vector measurement system according to claim 9, further comprising a means for calculating the Mach number M for an arbitrary sideslip angle $\beta$ by interpolation from an output of two reference Mach numbers Ms calculated using two calibrated $\beta$ coefficients having the angle $\beta$ therebetween.

11. The wide velocity range flight velocity vector measurement system according to claim 8, further comprising a means for calculating the Mach number M for an arbitrary sideslip angle $\beta$ by interpolation from an output of two reference Mach numbers Ms calculated using two calibrated $\beta$ coefficients having the angle $\beta$ therebetween.

12. A wide velocity range flight velocity vector measurement system, comprising:
   said measurement probe according to claim 1, and
   a means for calculating a reference Mach number Ms from a total pressure signal Ph, a static pressure signal Ps and a value of attack angle $\alpha$ on the basis of the following equation which is approximated by a fourth-order polynomial of Ps/Ph and $\alpha$, $$Ms(\alpha, Ps/Ph)=C40\alpha^4+C31\alpha^3(Ps/Ph)+C22\alpha^2(Ps/Ph)^2+C13\alpha(Ps/Ph)^3+C04(Ps/Ph)^4 C30\alpha^3+C21\alpha^2(Ps/Ph)+C12\alpha(Ps/Ph)^2 C03(Ps/Ph)^3+C20\alpha^2+C11\alpha(Ps/Ph)+C02(Ps/Ph)^2 C10\alpha+C01(Ps/Ph)+C00$$

where Cij is a matrix coefficient determined by wind tunnel tests in which a plurality of values of sideslip angle $\beta$ are set.

13. The wide velocity range flight velocity vector measurement system according to claim 12, further comprising a means for obtaining a highly precise reference Mach number by splitting a wide velocity range from low velocity to supersonic velocity into several velocity ranges, and determining the respective coefficients Cij.

14. The wide velocity range flight velocity vector measurement system according to claim 13, further comprising a means for calculating the Mach number M for an arbitrary sideslip angle $\beta$ by interpolation from an output of two reference Mach numbers Ms calculated using two calibrated $\beta$ coefficients having the angle $\beta$ therebetween.

15. The wide velocity range flight velocity vector measurement system according to claim 12, further comprising a means for calculating the Mach number M for an arbitrary sideslip angle $\beta$ by interpolation from an output of two reference Mach numbers Ms calculated using two calibrated $\beta$ coefficients having the angle $\beta$ therebetween.

16. A wide velocity range flight velocity vector measurement system comprising:
   a means for obtaining signals based on pressure information from a total pressure hole, four pressure holes in square pyramid surfaces of a base part and a static pressure hole at a sampling interval, and
   a means for comparing data for a current frame with data for a preceding frame,
   wherein at a point in time, if a difference between the current frame and the preceding frame does not exceed a threshold value, the data for the current frame is taken as the data for the point in time, and
   wherein if the difference between the current frame and the preceding frame exceeds the threshold value, the data for the preceding frame is taken as the data for the point in time.

* * * * *